(12) United States Patent
Clüsserath

(10) Patent No.: US 9,624,039 B2
(45) Date of Patent: Apr. 18, 2017

(54) METHOD AND CONTAINER-PROCESSING MACHINE FOR PROCESSING CONTAINERS

(71) Applicant: KHS GmbH, Dortmund (DE)

(72) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/034,684

(22) PCT Filed: Sep. 23, 2014

(86) PCT No.: PCT/EP2014/070264
§ 371 (c)(1),
(2) Date: May 5, 2016

(87) PCT Pub. No.: WO2015/067406
PCT Pub. Date: May 14, 2015

(65) Prior Publication Data
US 2016/0264361 A1    Sep. 15, 2016

(30) Foreign Application Priority Data
Nov. 7, 2013   (DE) .................. 10 2013 112 243

(51) Int. Cl.
| | |
|---|---|
| *B65G 37/00* | (2006.01) |
| *B65G 47/84* | (2006.01) |
| *B67C 3/24* | (2006.01) |
| *B67C 7/00* | (2006.01) |
| *B65G 29/00* | (2006.01) |

(52) U.S. Cl.
CPC ............ *B65G 37/00* (2013.01); *B65G 29/00* (2013.01); *B65G 47/846* (2013.01); *B67C 3/242* (2013.01); *B67C 3/244* (2013.01); *B67C 7/0013* (2013.01); *B67C 7/0046* (2013.01); *B65G 2201/0235* (2013.01)

(58) Field of Classification Search
CPC ....... B67C 3/242; B67C 3/244; B67C 7/0013; B67C 7/0046; B65G 29/00; B65G 37/00; B65G 47/846; B65G 2201/0235
See application file for complete search history.

(56) References Cited

U.S. PATENT DOCUMENTS

| | | | |
|---|---|---|---|
| 2,782,897 A | | 2/1957 | Filander |
| 4,073,372 A | * | 2/1978 | List ........................ B65B 43/50 |
| | | | 141/169 |

(Continued)

FOREIGN PATENT DOCUMENTS

| | | |
|---|---|---|
| DE | 603 939 | 10/1934 |
| DE | 11 28 774 | 4/1962 |

(Continued)

*Primary Examiner* — Mark A Deuble
(74) *Attorney, Agent, or Firm* — Occhiuti & Rohlicek LLP

(57) ABSTRACT

A method for processing containers includes periodically causing a reversible transporter to periodically transition between rotating in a first direction and rotating in a second direction that is opposite the first direction. When rotating in the first direction, the transporter feeds containers to a first processing region. When rotating in the second direction, the transporter feeds containers to a second processing region. Each processing region has as at least one processing position.

21 Claims, 3 Drawing Sheets

(56) References Cited

U.S. PATENT DOCUMENTS

| | | | | |
|---|---|---|---|---|
| 4,094,411 A | * | 6/1978 | Kronseder | B65G 29/00 209/522 |
| 4,266,653 A | | 5/1981 | Mergl | |
| 4,277,928 A | * | 7/1981 | Ahlers | B67B 3/06 53/64 |
| 5,082,105 A | * | 1/1992 | Tincati | B65G 47/846 198/473.1 |
| 5,582,285 A | * | 12/1996 | Kronseder | B65G 47/846 198/473.1 |
| 6,398,006 B1 | * | 6/2002 | Dault | B65C 9/04 198/377.01 |
| 2003/0106779 A1 | * | 6/2003 | Stocchi | B65G 29/00 198/803.3 |
| 2012/0175224 A1 | * | 7/2012 | Briggs | B65G 47/846 198/478.1 |
| 2016/0039617 A1 | * | 2/2016 | Clusserath | B65G 29/00 198/474.1 |

FOREIGN PATENT DOCUMENTS

| | | |
|---|---|---|
| DE | 38 33 885 | 4/1990 |
| DE | 10 2008 018 516 | 10/2009 |
| FR | 1 042 566 | 11/1953 |

* cited by examiner

METHOD AND CONTAINER-PROCESSING MACHINE FOR PROCESSING CONTAINERS

RELATED APPLICATIONS

This is the national stage, under 35 U.S.C. 371, of international application PCT/EP2014/070264, filed on Sep. 23, 2014, which claims the benefit of the Nov. 7, 2013 priority date of German application DE 102013112243.4, the contents of which are herein incorporated by reference.

FIELD OF INVENTION

This application relates to container processing, and in particular, to promoting higher throughput during container processing.

BACKGROUND

Known container processing machines, especially filling machines, include rotors having filling positions formed on a periphery thereof. Each filling position has a filling element. A container inlet brings empty containers to the rotor. These containers are individually transferred into filling positions. The filled containers leave through the container outlet. The filling elements are on the rotating rotor and so are entrained with it.

Other container processing machines have stationary processing stations past which a star moves containers. The star has container mounts for engaging the containers. In these machines, the star does not move continuously. As soon as a container reaches a processing position, the star remains stationary for the duration of the processing.

SUMMARY

The invention features methods used for filling containers with a liquid product. These containers can be larger-volume containers, such as party cans with a filling volume of, for example, five liters. In such practices, the container-processing machine is a filling machine.

In one aspect, the invention uses a transporter, such as a transport star or transfer star, that has, on its periphery, pocket-like container mounts that open peripherally. These mounts are at equal angular distances from one another relative to the machine axis. This distance is called a "pitch distance."

In some practices, the container that is conveyed to a processing position of the first and second processing region, before or during its processing in that region, for the purpose of release from the transporter, is moved from a first position, in which the container is engaged with the transporter or with a container mount, to a second position, in which the container is outside the range of action of the container mounts of the transporter, the movement being preferably effected by the container being raised relative to the transporter along an axis that is parallel or essentially parallel to the machine axis.

In other embodiments, a container-processing machine has at least one processing region that has two or more two processing positions.

In other embodiments, the processing regions have the same number of processing positions.

In some of those embodiments with multiple processing positions per processing region, container processing is carried out in parallel within a processing region.

In yet other embodiments, a restraining device controls the feeding of containers to be processed into container mounts of the transporter. In doing so, the restraining device stops feeding when the number of containers that have been transferred into container mounts of the transporter equals the number of processing positions.

Embodiments also include those in which any of the foregoing features exist in combination.

In another aspect, the transporter's rotation direction is periodically changed. In these embodiments, rotating the transporter in a first direction of rotation feeds containers to be processed to a first processing region having at least one processing position, and rotating it in a second direction contrary to the first direction feeds containers to be processed to a second processing region having at least one processing position.

In some embodiments, during the processing of the containers at one of the processing regions, the transporter feeds containers to be processed to the other one of the processing regions.

In some embodiments, the transporter is a transport star or transfer star having, on its periphery, a plurality of pocket-like container mounts that are open on the peripheral side thereof. These container mounts are provided at equal angular distances from one another relative to the machine axis. This angular distance is the pitch distance.

In other embodiments, at least one processing region, and preferably all processing regions, comprises at least two, and preferably more than two, processing positions, Also among the embodiments are those in which a processing head or filling element is provided at the at least one processing position.

In other embodiments, the distance between two processing positions that succeed one another in the directions of rotation of the transporter, or between the processing heads of the processing positions, equals the pitch distance of the container mounts on the transporter.

In yet other embodiments, the first processing region is formed on one side of a mid-plane enclosing the machine axis and the second processing region is formed on the other side of the mid-plane.

Embodiments also include those in which the container inlet and/or the container outlet are formed from sections of a transport belt. Among these are embodiments in which the common transport belt is guided beneath the transporter.

Yet other embodiments feature means for disengaging the containers from the transporter during processing at the processing positions.

In some embodiments, at least one processing position of each processing region comprises a container carrier that can be moved under the control of a lifting device between a lower position and an upper position for the lifting and lowering of the container. Examples include container carriers that suspend a container from a neck ring thereof and container carriers that support a container at its base.

Embodiments further include those in which at least one processing position of each processing region is a filling position for filling containers with liquid product.

Embodiments further include any combination of the foregoing embodiments.

In another aspect, the invention features a method for processing containers. Such a method includes receiving containers at a container inlet, moving the containers into container mounts of a reversible transporter, rotating the reversible transporter about a machine axis thereof, bringing the containers to processing positions that do not move with the reversible transporter, processing the containers at the processing positions, and after processing the containers, conveying the containers to a container outlet. In the course of executing this method, rotating the reversible transporter includes periodically causing the reversible transporter to transition between rotating in a first direction and rotating in a second direction that is opposite the first direction, and rotating the reversible transporter in the first direction includes feeding containers that are to be processed to a first processing region having at least one processing position. As a result of rotating the reversible transporter in the second direction, containers that are to be processed are fed to a second processing region having at least one processing position. While processing containers at the first processing region, the reversible transporter feeds containers that are to be processed into the second processing region.

Among these practices are those that also include disengaging a container from the reversible transporter prior to processing the container.

Some practices include, while feeding containers that are to be processed into the first processing region, conveying containers that have already been processed at the first processing region to the container outlet.

Yet other practices include selecting the reversible transporter to include a transport star that has container mounts on a periphery thereof. The container mounts are disposed at equal angular distances from one another relative to a machine axis. Among these are embodiments in which the container mounts are pockets that open in a peripheral direction. However, in other practices, the container mounts include grippers that open in a peripheral direction. In some of these practices, disengaging a container from the reversible transporter prior to processing the container includes raising the container out of engagement with the reversible transporter.

Other practices of the invention include those in which the first processing region includes plural processing positions that process containers in parallel.

Also among the practices of the invention are those that further include determining that the number of containers transferred into container mounts of the transporter is equal to the number of processing positions so that each processing position has one container to process, and restraining further feeding of containers.

Yet other practices include pre-processing the containers at the first processing region, and, following the pre-processing, processing the containers at the second processing region.

In another aspect, the invention features a container-processing machine for processing containers. The container-processing machine includes a rotatable transporter having container mounts. The transporter rotates in either a first direction or a second direction. As it does so, it conveys containers that are to be processed and that have been fed through a container inlet to processing positions that do not move with the transporter. The transporter also conveys containers that have been processed from the processing positions to a container outlet. When the transporter rotates in the first direction, containers follow a first container path between the container inlet and the container outlet. When the transporter rotates in the second direction, containers follow a second container path between the container inlet and the container outlet. The first and second container paths traverse corresponding first and second processing regions on opposite sides of a mid-plane of the transporter.

Some embodiments include a machine controller that periodically reverses the transporter's rotation.

In other embodiments, each processing position includes a lifter that is configured to raise a container, and to thereby disengage the container from the transporter.

Also among the embodiments are those in which each processing position includes a container carrier controlled by a lifter. In these embodiments, the lifting device causes the container carrier to move between a lower position and an upper position for lifting and lowering the container. Among these are embodiments in which the container carrier includes a suspender sized to engage a neck ring of a container, as well as those in which it includes a support surface sized to engage a base of a container.

In some embodiments, the transporter includes a star having container mounts around a periphery thereof. These mounts are distributed around the periphery according to a pitch angle so that each container mount is separated from adjacent container mounts by the pitch angle. The mounts themselves could be container pockets or container grippers. In some of these embodiments, the processing positions are distributed around the periphery according to the same pitch angle so that each processing position is separated from adjacent processing positions by the pitch angle.

In some embodiments, the first and second processing regions include equal numbers of processing positions.

In yet other embodiments, a transport belt includes a first section that forms the container inlet and a second section that forms the container outlet. This transport belt extends beneath the transporter.

Also among the embodiments are those in which at least one of the processing positions includes a filling position.

As used herein, a "container" includes a can or bottle made of metal, glass, plastic, or combinations thereof, as well as other packages that are suitable for filling powdered, granular, liquid, or viscous products.

As used herein, a "container present in sealed position against a processing head" is a container that lies with its container mouth pressed tightly up against the processing head or filling element or against a seal that is located there.

As used herein, the term "pressure-filling" refers to a filling method in which the container to be filled lies sealed against the filling element and is pre-tensioned before actual filling begins through a controlled gas path configured to carry a pressurized pre-tensioning gas that filling material displaces as a return gas out of the container as it flows in during the filling process through at least one controlled gas path configured in the filling element. This pre-tensioning phase may be preceded by other treatment phases, for example by an evacuation and/or a purging of the container interior with an inert gas such as $CO_2$ etc. using gas paths configured in the filling element.

As used herein, expressions such as "essentially," "in essence," or "around" mean variations from an exact value by ±10%, preferably by ±5% and/or variations that are insignificant for function.

Further embodiments, advantages, and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

These and other features and advantages of the invention will be apparent from the following detailed description and the accompanying figures, in which.

DETAILED DESCRIPTION

Figure 1:
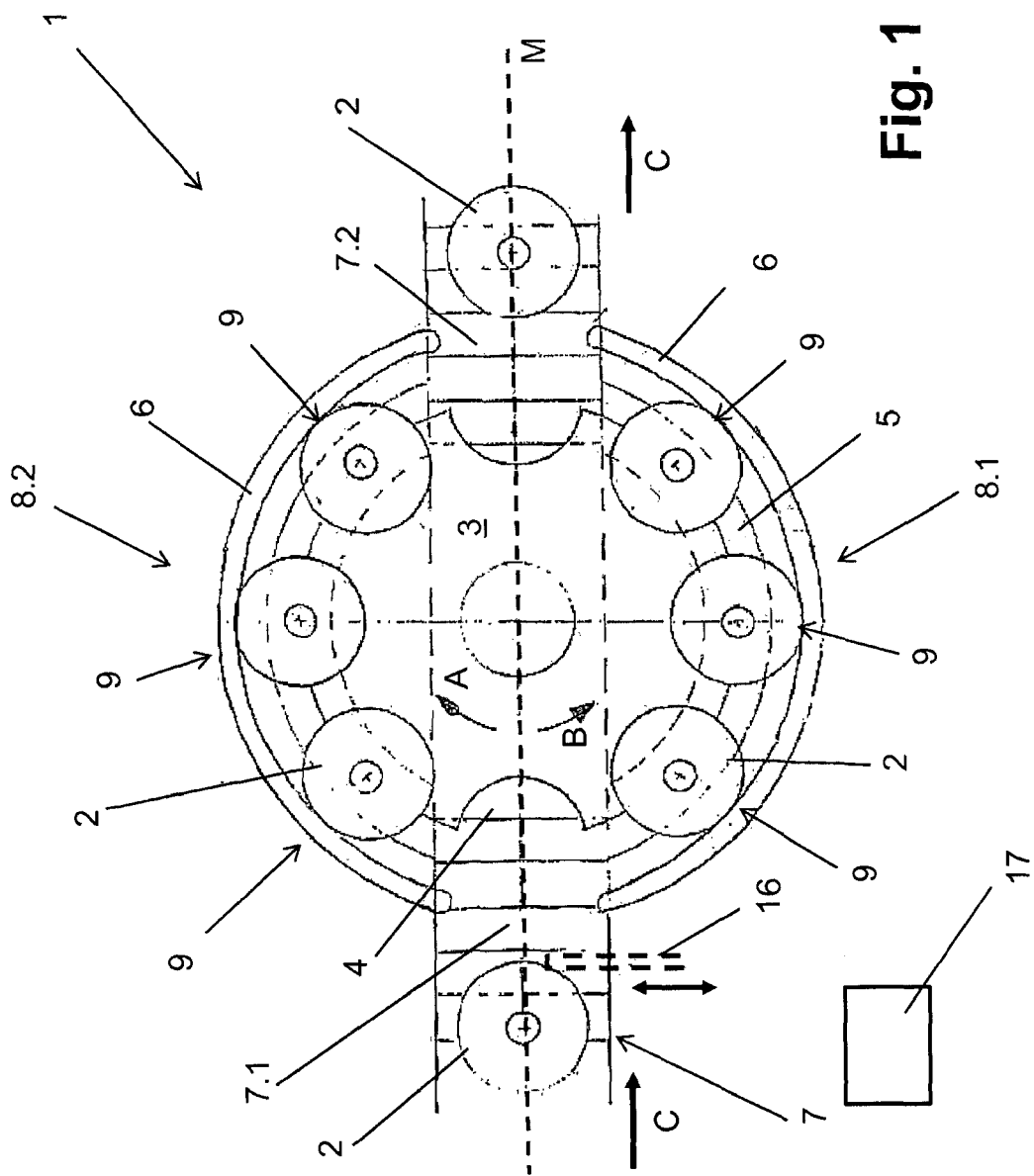
FIG. 1 shows a plan view of a filling machine.
Figure 2:
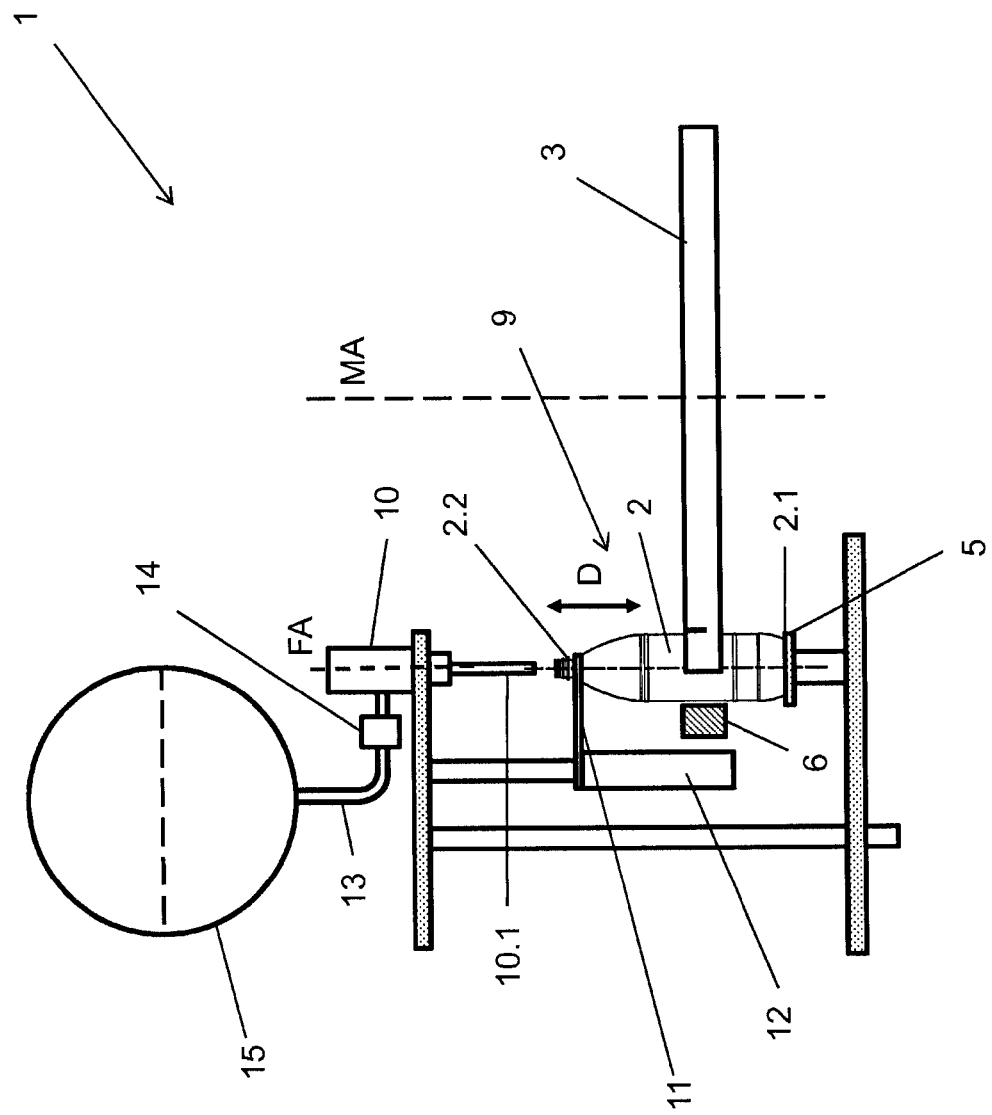
FIG. 2 shows an elevation view of the filling machine of FIG. 1.

FIGS. 1 and 2 show a container-processing machine 1 having a transfer star 3 that rotates about a vertical machine axis MA in discrete index steps. In each index step, the transfer star's angular position changes by a fixed circumferential angle. The transfer star 3 rotates in either a first direction B or a second direction A.

Around its periphery, the transfer star 3 has pocket-like container mounts 4 that open radially outwards. A fixed angular distance, or pitch, separates adjacent mounts 4. In the particular embodiment shown, the transfer star 3 has eight container mounts 4. However, other embodiments have different numbers of container mounts 4.

The transfer star 3 is part of a container transporter that also includes an annular sliding bar 5 and lateral arched container guides 6. The sliding bar 5 surrounds an axis coaxial with a machine axis MA. Containers 2 slide upright standing on their container base 2.1 along the sliding bar 5.

A guided transport-belt 7 extends across the underneath of the transfer star 3. The transport-belt 7 has a container inlet 7.1 and a container outlet 7.2. The container inlet 7.1 receives containers to be processed. The container outlet 7.2 releases containers that have been processed. These processed containers 2 are conveyed away in transporting direction C. A restraining device 16 at the container inlet 7.1 controls the flow of containers toward the transfer star 3.

In some embodiments, each processing position 9 has a filling element for filling containers. In these embodiments, the container inlet 7.1 receives empty containers that need to be filled and the container outlet 7.2 releases filled containers.

A vertical mid-plane M of the transport belt 7, and also of the container transporter 1, passes through the machine axis MA. Depending on its direction of rotation, the transfer star 3 forms first and second arc-shaped container transport paths or container processing paths between the container inlet 7.1 and the container outlet 7.2. The first container transport path lies on a first side of the mid-plane M and the second container transport path lines on a second side of the mid-plane M.

The choice of which of these first and second container transport paths a container takes depends on the star's direction of rotation. If the transfer star 3 rotates in the second direction A, the container takes the second container processing path. If the transfer star 3 rotates in the first direction B, the container takes the first transport path.

On the first side of the mid-plane M is a first processing region 8.1 formed on the transfer star 3. The first processing region 8.1 has three processing positions 9. In the illustrated embodiment, these processing positions 9 are configured as filling positions.

On the second side of the mid-plane M is a second processing region 8.2 formed on the transfer star 3. The second processing region 8.2 also has processing positions 9. The number of processing positions in the second processing region 8.2 is equal to the number of processing positions in the first processing region 8.1. In the illustrated embodiment, there are three processing positions 9 in the second processing region 8.2. Therefore, there are also three processing positions 9 in the first processing region 8.1.

A processing position 9 includes a processing head. In the embodiment shown in FIG. 2, the processing head is configured as a filling element 10 having a filling tube 10.1 and a container carrier 11. The filling tube 10.1 defines a vertical filling-element axis FA that is parallel to a machine axis MA. The container carrier 11 suspends a container 2 by a neck ring 2.2 provided beneath the container's mouth. A lifting element 12 raises or lowers the container carrier 11 in a controlled manner along a first direction D that is parallel to the filling element axis FA. In particular, the lifting element 12 lifts the container carrier 11 from a lower lifting-position to an upper lifting-position.

In the lower lifting-position, the container 2 rests with its container base standing on the sliding bar 5 and with part of its periphery accommodated by a container mount 4. In this lower lifting-position, the container's opening is at some distance away from a lower end of filling tube 10.1.

In the upper lifting-position, the filling tube 10.1 reaches through the container opening and into the container's interior. In this upper lifting-position, the lifting element 12 raises the container 2 far enough so that it is completely above the transfer star 3. As a result, the star's container mount 4 no longer accommodates the container 2. In this configuration, the container is said to have been disengaged.

A dedicated product line 13 having a flow meter 14 connects the filling element 10 to a product tank 15 that is common to all processing positions 9. During filling, liquid product partially fills the product tank 15.

The processing positions 9 of each of the first and second processing regions 8.1, 8.2 are disposed such that, when measured relative to the machine axis MA, the filling-element axes FA of adjacent processing positions 9 are separated by the same angular distance from one another. This angular distance equals the pitch distance of the container mounts 4 on the transfer star 3. The angular distance between the mid-plane M of the filling element axis FA that is adjacent to the container inlet 7.1 and the angular distance between the mid-plane M and the filling element axis FA that is adjacent to the container outlet 7.2 are both equal to a pitch distance between two container mounts 4 on the transfer star 3.

The processing procedure consists of a set of serially-executed sequences, each of which has four work cycles. These work cycles will be described in connection with the first processing region 8.1. The work in the second processing region 8.2 proceeds in an analogous manner. A machine controller 17 causes execution of the work cycles that make up each sequence.

In operation, the machine controller 17 causes the transfer star 3 to move containers to corresponding processing-positions 9. The lifting element 12 at each container-processing position 9 then raises a corresponding container 2 into its upper-lifting position for processing by the processing head. This also has the effect of disengaging the container 2 from the transfer star 3.

After the container 2 has been processed, the lifting element 12 lowers it back to its lower lifting-position and back into engagement with the transfer star 3. The machine controller 17 then causes processed containers to be pushed out of the transfer star 3 at the container outlet 7.2 to make room so that additional containers, which have yet to be processed, can be taken up at each processing positions 9.

The foregoing procedure is carried out for both the first and second processing regions 8.1, 8.2. However, since there is only one transfer star 3, the first and second processing regions 8.1, 8.2 take turns. Thus, there is a time delay such that while containers 2 are being processed at the first processing region 8.1, the transfer star 3 feeds containers 2 that have yet to be processed to the second processing region 8.2 and vice versa. At the same time, the machine controller 17 causes containers 2 that have already been processed to be pushed out through the container outlet 7.2.

Each sequence includes first through fourth work cycles.

In the first work cycle, the restraining device 16 releases containers 2 as the transfer star 3 rotates in the first direction B. As it does so, container mounts 4 move past the container inlet 7.1 to receive the containers 2.

The transfer star 3 then moves the containers 2 towards the first processing region 8.1. As soon as the transfer star 3 receives a number of containers 2 equal to the number of processing positions 9 in the first processing region 8.1, i.e. three containers 2 in the depicted embodiment, the restraining device 16 stops further containers 2 from being fed.

The transfer star 3 then moves containers 2 on in the first direction B until each filling element 10 or filling tube 10.1 in the first processing region 8.1 has an empty container 2 beneath it. Once this is the case, the transfer star 3 stops.

Meanwhile, as unprocessed containers 2 are moved to processing positions 9 of the first processing region 8.1, containers 2 that have already been processed, i.e. filled, are arranged in the container mounts 4 and conveyed to the container outlet 7.2.

The foregoing first work cycle is carried out in the same way at the second processing region 8.2.

In a second work cycle, with the transfer star 3 remaining stationary, corresponding lifting elements 12 raise the containers 2 at their corresponding processing positions 9 of the first processing region 8.1 from the lower lifting-position to the upper lifting-position. This disengages each container 2 from the transfer star 3 and seals it against an associated filling element 10. Meanwhile, at each processing position 9 in the second processing region 8.2, raised and filled containers 2 are lowered into waiting empty container mounts 4 of the transfer star 3 such that each container mount 4 accommodates one of the containers 2.

Then, in a third work cycle, at the first processing region 8.1, the filling elements 10 fill the raised containers 2. At the same time, the transfer star 3 rotates in the second direction A, and the restraining unit 16 allows containers 2 to be transferred to each of the container mounts 4 as they pass the container inlet 7.1. Once the transfer star 3 receives a number of containers 2 equal to the number of processing positions 9 of the second processing region 8.2, the restraining unit 16 again stops feeding containers 2. The rotary motion of the transfer star 3 stops as soon as containers 2 that it has received reach the processing positions 9 of the second processing region 8.2. At this point, each processing position 9 will have an unprocessed container 2 present therein.

As unprocessed containers 2 move to processing positions 9 of the second processing region 8.2, containers 2 that have already been processed are conveyed to the container outlet 7.2.

In a fourth work cycle, with the transfer star 3 remaining stationary, the lifting elements 12 raise corresponding containers 2 at the processing positions 9 of the second processing region 8.2 from the lower lifting-position to the upper lifting-position. This disengages each container 2 from the transfer star 3 and seals each container 2 against an associated filling element 10. At the processing positions 9 of the first processing region 8.1, the lifting elements 12 lower filled containers 2 into waiting empty container mounts 4. As a result, each container mount 4 accommodates one of the containers 2.

Completion of the fourth work-cycle completes one sequence.

In the subsequent first work cycle of a new sequence, the transfer star 3 rotates again in the first direction B and pushes filled containers 2 out of the first processing region 8.1 toward the container outlet 7.2. It then concurrently moves empty containers to the first processing region 8.1. As a result, there is once again a container 2 positioned beneath each filling element 10.

The machine controller 17 repeats the foregoing work cycles in sequence after sequence until all containers 2 are filled or until the filling process is finally ended.

The processing positions 9 of the first and second processing regions 8.1, 8.2 fill containers in parallel. This makes it possible to control different phases of the filling with common control valves that act on processing positions 9 and/or filling elements 10 thereof. These phases of filling include, for example: purging and/or pre-tensioning of the container interior with inert gas; fast and slow filling, calming, and depressurizing of filled containers 2 subsequent to pressure-filling.

In the foregoing embodiment, each container 2 has a container flange 2.2 beneath its mouth. However the principle of the filling machine described herein is also applicable when containers 2 stand on their container bases 2.1 on corresponding container carriers that raise them from their lower lifting-positions to their corresponding upper lifting-positions.

Figure 3:
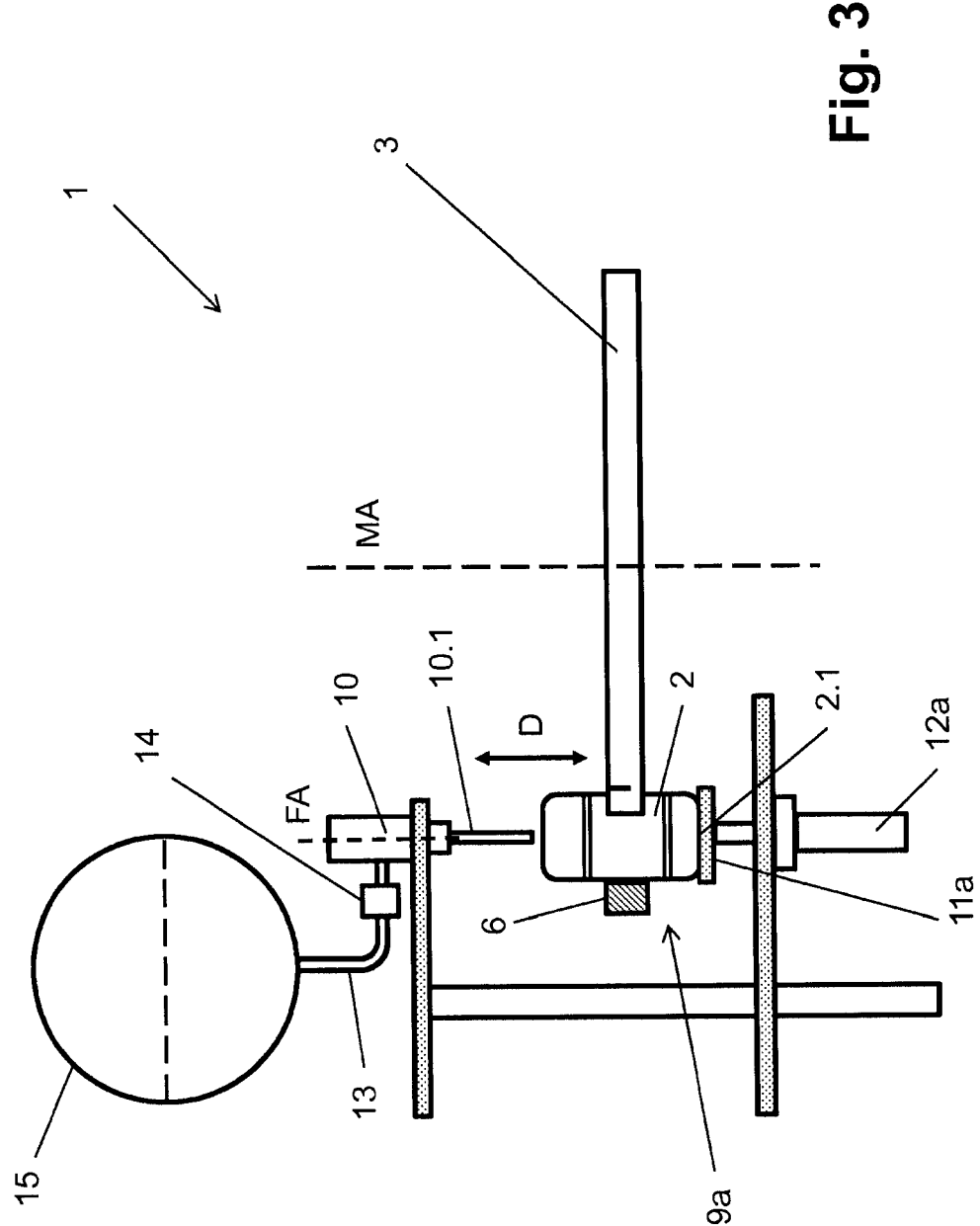
FIG. 3 shows an elevation view of an alternative embodiment of the container-filling machine.

In the alternative processing position 9a shown in FIG. 3 a sliding bar 5 forms a container carrier 11a shaped like a segment of a circle. The container 2 stands upright on its base 2.1 on this container carrier 11a. A lifting device 12a moves the container carrier 11a, and hence the container 2, in a vertical direction D between a lower lifting-position and an upper lifting-position.

In the lower lifting-position, a container mount 4 engages the container 2 at a certain distance beneath the filling tube 10.1. In the upper lifting-position, the lifting device 12a raises the container 2 out of the container mount 4 and seals it against the filling element 10. In this embodiment, the transfer star's diameter is small enough to avoid colliding with the lifter rod of the lifting element 12a when the container carrier 5a is in its upper lifting-position, but still large enough to ensure accommodation of the containers 2 in the container mounts. The alternative processing position 9a is particularly suited for filling party cans.

The apparatus described herein thus yields a simple, compact, and cost-effective machine that takes considerably less space than a conventional apparatus. In addition, the apparatus includes a much simpler drive because a drive motor is only required for the transfer star 3, the continuous transport belt 7 being driven by a discharge belt. The apparatus also results in a much shorter changeover time of containers 2 at processing positions 9, 9a because filled containers 2 are conveyed away while new empty containers 2 are fed to processing positions 9, 9a at the same time. Additionally, the apparatus permits rapid changeover between different container types, as well as safe and simple positioning of containers 2 beneath respective filling elements 10 by the transfer star. Another advantage is a considerable reduction in the number of control functions and control elements, such as electronic outputs, solenoid valves, and gas control valves that are used for gas and/or purging processes, including or inert gas purging and pre-tensioning. This advantage is particularly apparent when the filling process is started simultaneously and runs in parallel at all filling elements 10.

In addition, the stationary arrangement of the processing positions 9, 9a and the filling elements 10 avoids the need to transmit media, energy, and signals between the machine frame and either the rotor or processing positions configured on that rotor. This means that it is no longer necessary to provide a main drive for the rotor, a rotary joint between the rotor and the machine frame, a rotary media-distributor for product, for sterile gaseous and/or vaporous media, or for gas required to exercise pneumatic control over operation of the filling elements and/or control valve. It is also no longer necessary to provide slip rings and slip-ring distributors for power supply and/or electrical measurement and control signals, and torque supports.

The embodiments described are capable of satisfactory filling throughputs. For example, with eight processing positions 9, 9a at each of the first and second processing regions 8.1, 8.2, it is possible to fill up to 4000 half-liter bottles or cans per hour with beer using a transfer star 3 having a diameter of less than 1000 mm.

In the illustrated embodiment, the container-processing machine 1 is a filling machine. However in other embodiments, the container-processing machine 1 carries out another type of container processing, such as sterilizing containers 2.

Some embodiments use the second processing region 8.2 for pre-processing containers 2. In these embodiments, the transfer star 3 rotates in the first direction B to move the pre-processed containers from the second processing region 8.2 to the first processing region 8.

In those embodiments in which the container-processing machine 1 is a filling machine, it is possible for the filling machine to be a pressure-filling machine or an open-jet filling machine. In the case of an open-jet filling machine, the container's mouth is not sealed against a filling element during the filling process. Instead, the container's mouth is at a distance from the filling element so that filling content crosses free space on its way into the container.

In an alternative embodiment, the container mounts 4 take the form of grippers that open in a peripheral direction. These grippers grip and guide the containers that are to be processed and then release them again at the locations provided for this purpose.

The invention has been described by reference to embodiments. It goes without saying that further variations as well as modifications are possible without departing from the inventive concept underlying the invention.

Having described the invention, and a preferred embodiment thereof, what is claimed as new, and secured by Letters Patent is:

1. A method for processing containers, said method comprising receiving containers at a container inlet, moving said containers into container mounts of a reversible transporter, rotating said reversible transporter about a machine axis thereof, bringing said containers to processing positions that do not move with said reversible transporter, processing said containers at said processing positions, and after processing said containers, conveying said containers to a container outlet, wherein rotating said reversible transporter comprises periodically causing said reversible transporter to transition between rotating in a first direction and rotating in a second direction that is opposite said first direction, wherein rotating said reversible transporter in said first direction comprises feeding containers that are to be processed to a first processing region having at least one processing position, wherein rotating said reversible transporter in said second direction comprises feeding containers that are to be processed to a second processing region having at least one processing position, and, while processing containers at said first processing region, using said reversible transporter to feed containers that are to be processed into said second processing region.

2. The method of claim 1, further comprising disengaging a container from said reversible transporter prior to processing said container.

3. The method of claim 1, further comprising, while feeding containers that are to be processed into said first processing region, conveying containers that have already been processed at said first processing region to said container outlet.

4. The method of claim 1, further comprising selecting said reversible transporter to comprise a transport star comprising container mounts on a periphery thereof, wherein said container mounts are disposed at equal angular distances from one another relative to a machine axis.

5. The method of claim 4, further comprising selecting said container mounts to be container pockets, wherein said container pockets open in a peripheral direction.

6. The method of claim 4, further comprising selecting said container mounts to be container grippers, wherein said container grippers open in a peripheral direction.

7. The method of any one of claims 2, wherein disengaging a container from said reversible transporter prior to processing said container comprises raising said container out of engagement with said reversible transporter.

8. The method of claim 1, wherein said first processing region comprises plural processing positions, said method further comprising processing containers at said plural processing regions in parallel.

9. The method of claim 1, further comprising determining that the number of containers transferred into container mounts of said transporter is equal to the number of processing positions so that each processing position has one container to process, and restraining further feeding of containers.

10. The method of claim 1, further comprising pre-processing said containers at said first processing region, and, following said pre-processing, processing said containers at said second processing region.

11. An apparatus comprising a container-processing machine for processing containers, wherein said container-processing machine comprises a transporter, wherein said transporter comprises container mounts, wherein said transporter is rotatable about a machine axis in either a first direction or a second direction, wherein said transporter conveys containers that are to be processed and that have been fed through a container inlet to processing positions that do not move with said transporter, wherein said transporter conveys containers that have been processed from said processing positions to a container outlet, wherein, when said transporter rotates in said first direction, containers follow a first container path between said container inlet and said container outlet, wherein, when said transporter rotates in said second direction, containers follow a second container path between said container inlet and said container outlet, wherein said first container path traverses a first processing region, wherein said second container path traverses a second processing region, wherein said first and second processing regions comprise said processing positions, and wherein said first and second processing regions are on opposite sides of a mid-plane of said transporter.

12. The apparatus of claim 11, further comprising a machine controller, wherein said machine controller is configured to control said container processing machine, and wherein said controller is configured to periodically reverse rotation of said transporter.

13. The apparatus of claim 11, wherein each processing position comprises a lifter, wherein said lifter is configured to raise a container, and wherein said lifter is configured to disengage said container from said transporter.

14. The apparatus of claim 13, wherein each processing position comprises a container carrier, wherein said lifter controls said container carrier, wherein said lifter causes said container carriers to move between a lower position and an upper position for lifting and lowering said container.

15. The apparatus of claim 14, wherein said container carrier comprises a suspender sized to engage a neck ring of a container.

16. The apparatus of claim 14, wherein said container carrier comprises a support surface sized to engage a base of a container.

17. The apparatus of claim 11, wherein said transporter comprises a star having container mounts around a periphery thereof, wherein said container mounts comprise container pockets, wherein said container mounts are distributed around said periphery according to a pitch angle, wherein each container mount is separated from adjacent container mounts by said pitch angle.

18. The apparatus of claim 11, wherein said first and second processing regions comprise equal numbers of processing positions.

19. The apparatus of claim 17, wherein said processing positions are distributed around said periphery according to said pitch angle, wherein each processing positions is separated from adjacent processing positions by said pitch angle.

20. The apparatus of claim 11, further comprising a transport belt, wherein said transport belt comprises a first section that forms said container inlet and a second section that forms said container outlet, wherein said transport belt extends beneath said transporter.

21. The apparatus of claim 11, wherein at least one of said processing positions comprises a filling position.

\* \* \* \* \*